UNITED STATES PATENT OFFICE.

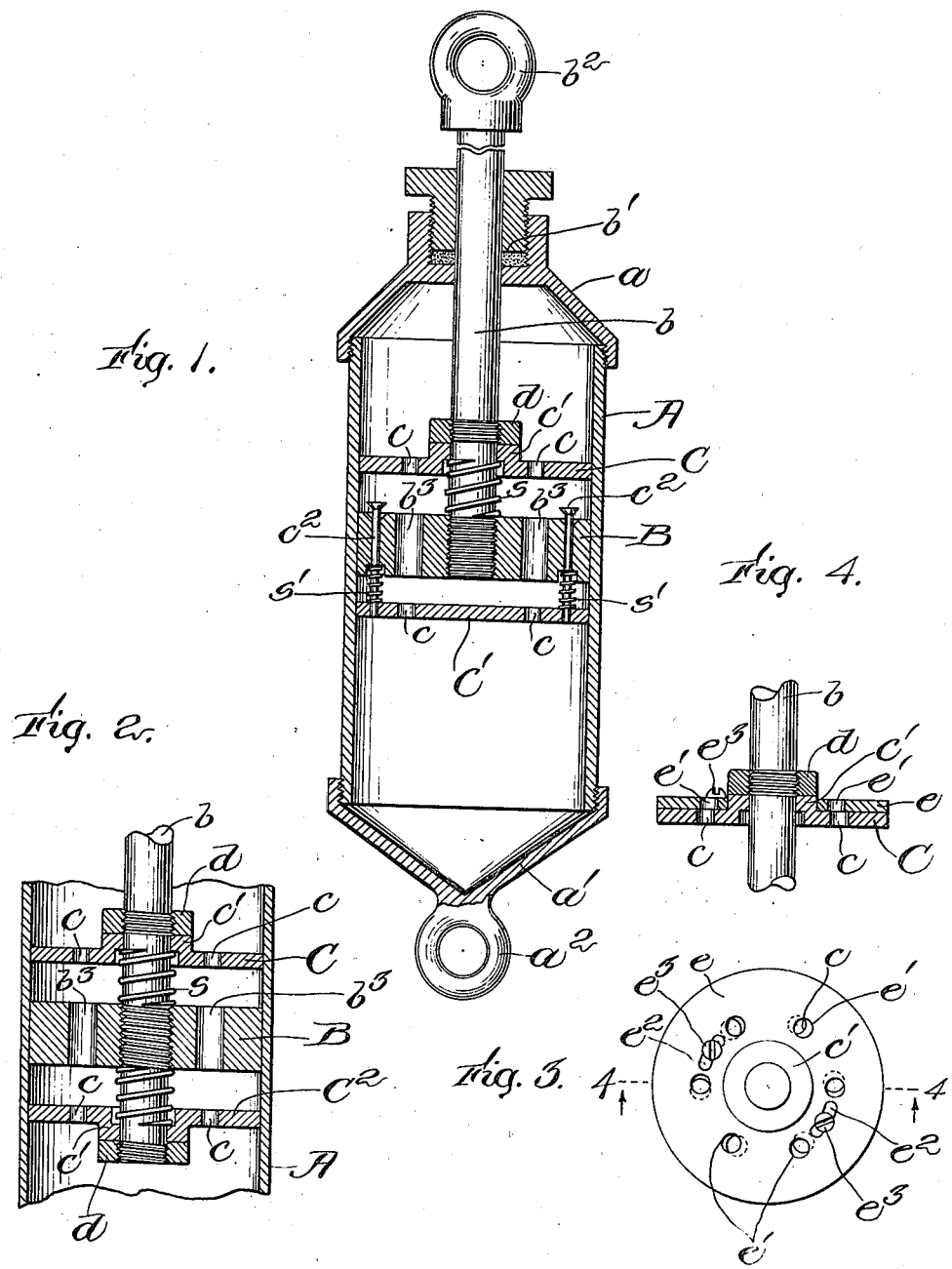

HORACE B. STANTON, OF BOSTON, MASSACHUSETTS.

SHOCK-ABSORBER.

1,028,400.  Specification of Letters Patent.  Patented June 4, 1912.

Application filed August 8, 1910. Serial No. 576,066.

*To all whom it may concern:*

Be it known that I, HORACE B. STANTON, a citizen of the United States, and a resident of Boston, in the county of Suffolk and State of Massachusetts, have invented new and useful Improvements in Shock-Absorbers, of which the following is a specification.

This invention relates to shock-absorbers of the cylinder and piston type, for vehicles generally, and particularly to shock-absorbers for automobiles; and its object is to improve the construction and operation of such shock-absorbers in the manner hereinafter particularly described, and pointed out in the claims.

In the accompanying drawings which illustrate certain embodiments of my invention,—Figure 1 is a longitudinal central section of a shock-absorber embodying one form of my invention; Fig. 2 is a fragmentary longitudinal central section illustrating a modified form of the invention; Fig. 3 is a detail view in plan of a modification of one of the auxiliary pistons; and Fig. 4 is a sectional view on line 4—4 of Fig. 3.

A represents a cylinder provided with the closed ends or heads $a$ and $a'$, the latter being provided with a suitable ring or eye $a^2$, adapted to be secured to the axle of a vehicle.

B is the main piston secured fast to the piston rod $b$, which passes through a suitable stuffing box $b'$ in head $a$, and is provided with a ring or eye $b^2$ for attachment to the body of the vehicle. The piston B is made with one or more holes $b^3$, forming passages therethrough.

At opposite sides of the main piston B are the two auxiliary pistons C and C', each provided with holes $c$ forming passages registering with the holes $b^3$ of the main piston but of smaller area than the holes $b^3$. Each auxiliary piston C and C' is movable relatively to the main piston B, and is yieldingly held apart from the main piston by springs. In the form shown in Fig. 1, provision is made for such relative movement as follows: The upper auxiliary piston C is mounted to slide on piston rod $b$, the nut $d$ forming a shoulder to limit the upward movement of the piston C. The piston C is provided with a hub $c'$, which has a sliding fit with piston rod $b$, and is preferably recessed on its under side to receive one end of coil spring $s$, the other end of which abuts against the main cylinder B. Spring $s$ tends normally to urge the main piston B and auxiliary piston C apart. The other auxiliary piston C' is provided with a number of headed pins $c^2$, which extend through and slide in perforations in the main piston B. The heads of pins $c^2$ limit the movement of piston C' away from the main piston, and coil springs $s'$, which are held between the main piston and auxiliary piston C', tend normally to urge said pistons apart, the upper ends of said springs $s'$ being held in recesses provided therefor in the under side of piston B.

In the modification shown in Fig. 2, the main piston B and the upper auxiliary piston C, are the same as in Fig. 1. The lower auxiliary pistion $C^2$, instead of being mounted to slide with relation to the main piston by means of pins $c^2$, is mounted to slide on an extension of piston rod $b$, and is identical in all respects with the upper auxiliary piston C. When this form of lower auxiliary piston is used, the conical or concave form of cylinder head $a'$ becomes particularly important as it affords a space for the protruding hub $c'$ and nut $d$ at the end of the piston rod. In either form it will be seen that while the two auxiliary pistons and the main piston are relatively movable, nevertheless they are all carried by the piston rod $b$ and are movable together as one part.

The cylinder A is filled with a suitable oil, or glycerin, or other suitable fluid, preferably non-congealable.

The large passages $b^3$ in the main piston B permit a certain amount of comparatively free and unrestrained movement of piston B between the two auxiliary pistons,—sufficiently free, so that the relative movement of the cylinder and piston is not emphatically checked during short strokes of the piston resulting from the ordinary vibration of the vehicle or slight inequalities of the road, nor during the first part of a long stroke, resulting from more pronounced inequalities of the road. During the latter part of a long stroke in either direction the main piston is forced against one or the other of the auxiliary pistons, depending upon the direction of movement of the main piston, compressing the springs which normally tend to hold such auxiliary piston away from the main piston, and the rest of the stroke will be more emphatically restrained owing to the relatively small passages through the auxiliary piston. As the auxiliary piston, which for the time being is doing the work and bearing the pressure, abuts flat against the solid main piston, the latter bears practically the entire strain, and a very strong and durable device results.

In order to regulate and adjust the degree in which the movement of the main piston will be arrested or restrained by the auxiliary pistons, the area of the passages through the auxiliary pistons may be made adjustable or variable. To this end I have devised the structure shown in Figs. 3 and 4, wherein $e$ represents a valve in the form of a plate or disk lying against the disk or piston C and mounted to turn on hub $c'$. The disk $e$ is provided with holes $e'$, arranged to register with the holes $c$ of piston C, and with slots $e^2$ through which pass the headed screws $e^3$, which are set in disk C. When screws $e^3$ are loosened the disk $e$ may be given the desired angular adjustment partially to close the passages $c$, after which by turning up the screws the disk $e$ may be secured in adjusted position. Both auxiliary pistons may be provided with such adjustable disks if desired, so as to regulate the checking or restraint of the stroke in either direction independently of the other.

I claim:

1. A shock-absorber comprising a cylinder, a main piston having passages therethrough, and two auxiliary pistons, one at each side of the main piston, said main piston being movable relatively to the auxiliary pistons, and said auxiliary pistons having passages therethrough of smaller area than the passages of the main piston and being adapted partially to restrain the latter part of the movement of the main piston in each direction.

2. A shock-absorber comprising a cylinder, a main piston having passages therethrough, and two auxiliary pistons, one at each side of the main piston, said main piston being movable relatively to the auxiliary pistons, and all of said pistons being movable together as one part, said auxiliary pistons having passages therethrough of smaller area than the passages of the main piston and being adapted partially to restrain the latter part of the movement of the main piston in each direction.

3. A shock-absorber comprising a cylinder, a main piston having passages therethrough, two auxiliary pistons, one at each side of the main piston, and a piston rod carrying all of said pistons, said auxiliary pistons mounted to slide longitudinally with relation to said piston rod and having passages therethrough of smaller area than the passages of the main piston and being adapted partially to restrain the latter part of the movement of the main piston in each direction.

4. A shock-absorber comprising a cylinder, a main piston having passages therethrough, and two auxiliary pistons one at each side of the main piston, said main piston being movable relatively to the auxiliary pistons, and said auxiliary pistons having passages therethrough of smaller area than the passages of the main piston and being adapted partially to restrain the latter part of the movement of the main piston in each direction, and means to vary the area of the passages through one at least of said auxiliary pistons.

5. A shock-absorber comprising a cylinder, a piston rod, a main piston on the piston rod, having passages therethrough, and two auxiliary pistons one at each side of the main piston, said auxiliary pistons having passages therethrough of smaller area than the passages of the main piston, one of said auxiliary pistons being mounted to slide on said piston rod, and the other being provided with pins adapted to slide through the main piston.

6. A shock-absorber comprising a cylinder, a main piston having passages therethrough, two auxiliary pistons one at each side of the main piston, and a piston rod carrying all of said pistons, said auxiliary pistons mounted to slide longitudinally with relation to said piston rod and having passages therethrough of smaller area than the passages of the main piston and being adapted partially to restrain the latter part of the movement of the main piston in each direction, and springs normally urging each of said auxiliary pistons away from said main piston.

7. A shock-absorber comprising a cylinder, a main piston having passages therethrough, two auxiliary pistons one at each side of the main piston, and a piston rod carrying all of said pistons, said auxiliary pistons mounted to slide longitudinally with relation to said piston rod and having passages therethrough of smaller area than the passages of the main piston and being adapted partially to restrain the latter part of the movement of the main piston in each direction, each of said auxiliary pistons during its operative stroke adapted to lie against and transmit its strain to said main piston.

Signed by me at Boston, Massachusetts this twenty-ninth day of July 1910.

HORACE B. STANTON.

Witnesses:
ROBERT CUSHMAN,
CHARLES D. WOODBERRY.